United States Patent
Kim et al.

(10) Patent No.: US 7,469,069 B2
(45) Date of Patent: Dec. 23, 2008

(54) METHOD AND APPARATUS FOR ENCODING/DECODING IMAGE USING IMAGE RESIDUE PREDICTION

(75) Inventors: Woo-shik Kim, Gyeonggi-do (KR); Hyun-mun Kim, Gyeonggi-do (KR); Dae-Sung Cho, Seoul (KR)

(73) Assignee: Samsung Electronics Co., Ltd., Suwon-Si, Gyeonggi-Do (KR)

(*) Notice: Subject to any disclaimer, the term of this patent is extended or adjusted under 35 U.S.C. 154(b) by 1001 days.

(21) Appl. No.: 10/845,256

(22) Filed: May 14, 2004

(65) Prior Publication Data

US 2005/0281473 A1    Dec. 22, 2005

(30) Foreign Application Priority Data

May 16, 2003   (KR) ............... 10-2003-0031322
Oct. 18, 2003   (KR) ............... 10-2003-0072810

(51) Int. Cl.
    G06K 9/36    (2006.01)
(52) U.S. Cl. .............. 382/236; 382/232; 382/233; 382/239
(58) Field of Classification Search ........... 382/232, 382/233, 251, 236, 239; 375/240.16, 240.17; 348/402.1, 699; 358/426.13; 345/418, 419; 386/52, 68, 109
See application file for complete search history.

(56) References Cited

U.S. PATENT DOCUMENTS 5,513,128 A    4/1996   Rao ................. 382/232
5,703,649 A    12/1997  Kondo ............... 375/240.16
5,768,438 A *  6/1998   Etoh ................ 382/251
5,835,034 A    11/1998  Seroussi et al. .... 341/65
6,385,386 B1 * 5/2002   Aotake ............. 386/68

(Continued)

FOREIGN PATENT DOCUMENTS

WO    03/021971 A1    3/2003

OTHER PUBLICATIONS

International Organisation for Standardisation Organisation Internationale De Normalisation ISO/IEC JTC 1/SC 29/WG 11 Coding of Moving Pictures and Audio, N5555, Pattaya, Mar. 2003, pp. 1-226.

(Continued)

*Primary Examiner*—Anh Hong Do
(74) *Attorney, Agent, or Firm*—Buchanan Ingersoll & Rooney PC

(57) ABSTRACT

An encoding method may comprise obtaining a residue corresponding to a difference between the original image and a prediction image with respect to each component of the original image, encoding the residue of a predetermined component of the original image, restoring the encoded residue of the predetermined component and transforming the restored residue into a predetermined value including the restored residue value, and encoding prediction residues corresponding to differences between each of residues of components of the original image, which are not encoded, and the residue, which is restored and transformed into the predetermined value. Since prediction residues are encoded and decoded using correlations between residues of image components and image components, data amount is highly reduced. Also, since there is no quality loss in a picture generated by directly encoding an R-G-B image without transforming it into a Y-Cr-Cb image, high quality image information is obtained.

50 Claims, 9 Drawing Sheets

U.S. PATENT DOCUMENTS

| | | | |
|---|---|---|---|
| 6,535,647 B1 | 3/2003 | Abousleman | 382/253 |
| 6,573,890 B1 * | 6/2003 | Lengyel | 345/419 |
| 7,092,445 B2 * | 8/2006 | Haskell et al. | 375/240.2 |
| 2004/0233989 A1 | 11/2004 | Kobayashi et al. | 375/240.16 |

OTHER PUBLICATIONS

James M. Spring et al., "Lossless Compression of Multispectral Images with Interband Prediction Error Deltas", IEEE Computer Society, Nov. 3, 1996, pp. 586-590.

Xiaolin Wu et al., "Context-Based Lossless Interband Compression-Extending CALIC", IEEE Transactions on Image Processing, vol. 9, No. 6, Jun. 2000, IEE Inc., New York, US, pp. 994-1001.

Steven Van Assche et al., "Lossless Compression of Pre-Press Images Using a Novel Colour Decorrelation Technique", The Journal of the Pattern Recognition Society, Pergamon Press Inc., Elmsford, NY, US, Mar. 1999, pp. 435-441.

James M. Spring et al., "Improved Prediction for Lossless Compression of Multispectral Images", SPIE, vol. 3025, Feb. 10, 1997, pp. 83-90.

"Lossless and Near-Lossless Coding of Continuous Tone Still Images (JPEG-LS)", ISO/IEC JTC1/SC29/WG1 FCD 14495 0 Public Draft, Jul. 16, 1997, pp. I-IV, 1-75.

P N Tudor, "MPEG-2 Video Compression Tutorial", IEE Colloquium on MPEG, IEE London, GB, 1995, pp. 2/1-2/8.

Woo-Shik Kim et al, "Inter-Plane Prediction for RGB Coding", ISO-IEC JTC1-SC29-WG11 and ITU-T SG16 Q. 6, Jul. 22, 2003, pp. 1-10.

European Patent Office Search Report, Sep. 2004.

Korean Office Action for Application No. 10-2003-0072810, dated Oct. 31, 2005, and translation.

First Official Action issued by the Patent Office of the People's Republic of China on Dec. 15, 2006, in corresponding Chinese Patent Application No. 200410068402.1, and English translation thereof.

* cited by examiner

MACRO BLOCK DIVIDING : 16x16, 16x8, 8x16, 8x8

8x8 BLOCK DIVIDING : 8x8, 8x4, 4x8, 4x4

METHOD AND APPARATUS FOR ENCODING/DECODING IMAGE USING IMAGE RESIDUE PREDICTION

BACKGROUND OF THE INVENTION

This application claims the priority of Korean Patent Application Nos. 2003-31322, filed on May 16, 2003, and 2003-72810, filed on Oct. 18, 2003, in the Korean Intellectual Property Office, the disclosures of which are incorporated herein in their entirety by reference.

1. Field of the Invention

The present invention relates to image encoding and decoding, and more particularly, to an image encoding/decoding method and apparatus using residue prediction of an image.

2. Description of the Related Art

In general, to increase compression ratio, an R-G-B image output from a device is transformed into a Y-Cr-Cb image suitable for compression. However, when the R-G-B image is transformed into the Y-Cr-Cb image, picture quality is damaged. In general, when the Y-Cr-Cb image is compressed, Cr and Cb components are encoded by reducing their magnitudes by 4 times for compression efficiency. Therefore, after the Y-Cr-Cb image is encoded, it is difficult to restore the original image with high quality.

If each of R-G-B components is independently encoded in a conventional Y-Cr-Cb encoder in order to reduce the transform loss of the Y-Cr-Cb image, since correlations among the R-G-B components cannot be used, encoding efficiency drops. A conventional compression method in this respect is presented in the AVC/H.264 standard jointly developed by the ISO/IEC MPEG and ITU-T VCEG groups. A detailed description of this method is disclosed in "Text of ISO/IEC FDIS 14496-10: Information Technology—Coding of audio-visual objects—Part 10: Advanced Video Coding", ISO/IEC JTC 1/SC 29/WG 11, N5555, March, 2003.

SUMMARY OF THE INVENTION

The present invention provides a method and apparatus for encoding/decoding an image using image residue prediction, which can encode R-G-B components by effectively removing redundant information among the R-G-B components while directly encoding the R-G-B components without transforming an R-G-B image into a Y-Cr-Cb image in order to encode the R-G-B components with high picture quality.

According to an aspect of the present invention, there is provided an image encoding method using residue prediction of an image, which encodes an original image including at least more than two components, the method comprising: obtaining a residue corresponding to a difference between the original image and a prediction image with respect to each component of the original image; encoding the residue of a predetermined color component of the original image; restoring the encoded residue of the predetermined color component and transforming the restored residue into a predetermined value including the restored residue value; and encoding prediction residues corresponding to differences between each of residues of components of the original image, which are not encoded, and the residue, which is restored and transformed into the predetermined value.

It is preferable that the residue be transformed into the predetermined value using correlations among components of the original image.

It is preferable that the original image be one of an R-G-B image, a Y-Cb-Cr image, and an X-Y-Z image.

According to another aspect of the present invention, there is provided an image encoding method using residue prediction of an image, the method comprising: obtaining a temporal residue corresponding to a difference between an original image and a prediction image with respect to R-G-B components of a color image by estimating a motion between a current frame and a previous frame; encoding a residue of the G component; restoring the encoded residue of the G component and transforming the restored residue of the G component into a predetermined value including the restored residue value of the G component; and encoding prediction residues corresponding to differences between each of residues of R and B components of the original image, which are not encoded, and the residue of the G components transformed into the predetermined value.

It is preferable that the motion estimation be performed in units of predetermined sized blocks.

It is preferable that the restored residue of the G component be transformed into the predetermined value using correlations among the R, G, and B components.

It is preferable that the restored residue of the G component be transformed into the predetermined value using a linear transformation by multiplying the restored residue value of the G component by a predetermined value and adding an offset to the multiplied value.

It is preferable that the linear transformation be applied differently according to the block sizes used when a motion is compensated in units of blocks from the previous frame.

According to another aspect of the present invention, there is provided an image encoding method using residue prediction of an image, the method comprising: obtaining a spatial residue corresponding to a difference between an original image and a prediction image with respect to R-G-B components of a color image by estimating a prediction direction from pixels spatially close to a pixel block of a current frame; encoding the residue of the G component; restoring the encoded residue of the G component and transforming the restored residue of the G component into a predetermined value including the restored residue value of the G component; and encoding prediction residues corresponding to differences between each of residues of the R-B component of the original image, which are not encoded, and the residue of the G component transformed into the predetermined value.

It is preferable that the restored residue of the G component be transformed into the predetermined value using a linear transformation by multiplying the restored residue value of the G component by a predetermined value and adding an offset to the multiplied value.

It is preferable that the linear transformation be applied differently according to the spatial prediction directions used when residues of R-G-B components are obtained.

According to another aspect of the present invention, there is provided an image encoding method using residue prediction of an image, which encodes an R-G-B color image, the method comprising: (1) in an inter mode, obtaining a prediction image by estimating a motion in units of predetermined sized blocks between a previous frame and a current frame with respect to each color component and generating a temporal residue by subtracting the prediction image from an original image; (2) in an intra mode, obtaining a prediction image by estimating a prediction direction from spatially adjacent pixels of a pixel block of a current frame of each color component and generating a spatial residue by subtracting the prediction image from an original image; (3) encoding the residue of the G component and restoring the encoded residue of the G component; (4) obtaining prediction residues of the R-B components using the residue of the G component restored in step (3) and the residues of the R-B components generated in step (1) or (2); (5) encoding the prediction residue values of the R-B component obtained in step (4) and restoring the encoded prediction residue images of the R-B component; and (6) obtaining restored residue values of the R-G-B component using the restored residue image of the G component and the restored prediction residue images of the R-B components and generating restored images of the R-G-B components by adding the restored residue values of the R-G-B components to the prediction image value.

It is preferable that step (3) comprise performing a frequency transformation, a quantization, and a variable length encoding of the residue of the G component for compressing the residue of the G component and obtaining a restored residue image of the G component by performing inverse quantization and inverse frequency transformation of the quantized value again, and step (5) comprise performing a frequency transformation, a quantization, and a variable length encoding of the prediction residue values of the R-B components obtained in step (4) and obtaining restored prediction residue images of the R-B components by performing inverse quantization and inverse frequency transformation of the quantized values again.

It is preferable that step (4) comprise: performing a linear transformation by multiplying the restored residue value of the G component by a predetermined value and adding an offset to the multiplied value; and obtaining prediction residues corresponding to differences between each of the residues of the R-B component of the original image, which are not encoded, and the linear transformed residue of the G component.

According to another aspect of the present invention, there is provided an image encoding apparatus using residue prediction of an image, which encodes an original image including at least more than two components, the apparatus comprising: a residue generator, which generates a difference between the original image and a prediction image with respect to each color component of the original image; a residue encoder, which encodes a residue of a predetermined color component of the original image generated by the residue generator and prediction residues generated by a prediction residue generator; a residue transformer, which restores the encoded residue of the predetermined color component and transforms the restored residue into a predetermined value including the restored residue value; and the prediction residue generator, which generates differences between each residues of color components of the original image, which are not encoded, and the residue, which is restored and transformed into the predetermined value.

According to another aspect of the present invention, there is provided an image encoding apparatus using residue prediction of an image, which encodes an R-G-B color image, the apparatus comprising: a motion prediction image generator, which estimates a motion between a current frame and a previous frame in units of predetermined sized blocks and outputs a corresponding block; a residue generator, which generates a temporal residue corresponding to a difference between an image generated by the motion prediction image generator and the corresponding block of the current frame with respect to R-G-B components of the color image; a compression encoder, which compresses and encodes a residue of the G component generated by the residue generator and prediction residues of the R-B components generated by a prediction residue generator; an inverse compression decoder, which decodes the compressed and encoded data and generates a restored residue of the G component and restored prediction residues of the R-B components; a residue transformer, which transforms the restored residue of the G component into a predetermined value including the restored residue value of the G component using correlations among the R-G-B components; and a prediction residue generator, which generates differences between each of the residues of the R-B components generated by the residue generator and the residue of the G component transformed by the residue transformer.

According to another aspect of the present invention, there is provided an image encoding apparatus using residue prediction of an image, which encodes an R-G-B color image, the apparatus comprising: a spatial prediction image generator, which estimates a prediction direction from pixels spatially close to a pixel block of a current frame and outputs a corresponding block; a residue generator, which generates a spatial residue corresponding to a difference between an image generated by the spatial prediction image generator and the corresponding block of the current frame with respect to R-G-B components of the color image; a compression encoder, which compresses and encodes a residue of the G component generated by the residue generator and prediction residues of the R-B components generated by a prediction residue generator; an inverse compression decoder, which decodes the compressed and encoded data and generates a restored residue of the G component and restored prediction residues of the R-B components; a residue transformer, which transforms the restored residue of the G component into a predetermined value including the restored residue value of the G component using correlations among the R-G-B components; and a prediction residue generator, which generates differences between each of the residues of the R-B components generated by the residue generator and the residue of the G component transformed by the residue transformer.

According to another aspect of the present invention, there is provided an image encoding apparatus using residue prediction of an image, which encodes an R-G-B color image, the apparatus comprising: a motion prediction image generator, which estimates a motion between a current frame and a previous frame in units of predetermined sized blocks and outputs a corresponding block; a spatial prediction image generator, which estimates a prediction direction from pixels spatially close to a pixel block of a current frame and outputs a corresponding block; a residue generator, which generates a temporal residue corresponding to a difference between an image generated by the motion prediction image generator and the corresponding block of the current frame in an inter mode, or generates a spatial residue corresponding to a difference between an image generated by the spatial prediction image generator and the corresponding block of the current frame in an intra mode; a compression encoder, which compresses and encodes a residue of the G component generated by the residue generator and prediction residues of the R-B components generated by a prediction residue generator; an inverse compression decoder, which decodes the compressed and encoded data and generates a restored residue of the G component and restored prediction residues of the R-B components; a residue transformer, which performs a linear transformation on the restored residue of the G component generated by the inverse compression decoder; a prediction residue generator, which generates differences between each of the residues of the R-B components generated by the residue generator and the value transformed by the residue transformer; a residue compensation unit, which generates restored residues of the R-B components by adding the prediction residues of the R-B components generated by the inverse compression decoder to the value transformed by the residue transformer; and an original image generator, which generates an original image by adding the residues of the R-B components generated by the residue compensation unit and the residue of the G component generated by the inverse compression decoder to the prediction image generated by the motion prediction image generator in an inter mode, or generates an original image by adding the residues of the R-B components generated by the residue compensation unit and the residue of the G component generated by the inverse compression decoder to the prediction image generated by the spatial prediction image generator in an intra mode.

It is preferable that the motion prediction image generator comprise: a motion estimation unit, which estimates a motion between a current frame and a previous frame in units of predetermined sized blocks; and a motion prediction unit, which outputs a block corresponding to a motion vector generated by the motion estimation unit, and the spatial prediction image generator comprise: a spatial estimation unit, which estimates a prediction direction from pixels spatially close to a pixel block of the current frame; and a spatial prediction unit, which outputs a block corresponding to the direction predicted by the spatial estimation unit.

It is preferable that the compression encoder comprise: a frequency transformer, which compresses the residue of the G component generated by the residue generator and the prediction residues of the R-B components generated by the prediction residue generator; a quantizer, which quantizes data compressed by the frequency transformer; and an entropy coder, which performs entropy encoding of the quantized data, and the inverse compression decoder comprises: an inverse quantizer, which inverse-quantizes the quantized data; and an inverse frequency transformer, which performs an inverse frequency transformation of the inverse quantized data and generates restored residue of the G component and restored prediction residues of the R-B components.

According to another aspect of the present invention, there is provided an image decoding method using residue prediction of an image, which decodes an encoded original image including at least more than two components, where a residue is defined as a difference between the original image and a prediction image, and a prediction residue is defined as a difference between a residue of each component of the original image and a value that an encoded residue of a predetermined color component is restored and transformed into a predetermined value, the method comprising: decoding a residue of a predetermined color component of the encoded original image; transforming the decoded residue into a predetermined value; decoding prediction residues of the components, which are not decoded; obtaining residues of the components, which are not decoded, by adding the value transformed into the predetermined value to the prediction residues; and restoring the original image by adding a prediction image to the residue of each component.

It is preferable that the decoded residue be transformed into the predetermined value using correlations among components configuring the original image.

It is preferable that the original image be one of an R-G-B image, a Y-Cb-Cr image, and an X-Y-Z image.

According to another aspect of the present invention, there is provided an image decoding method using residue prediction of an image, which decodes an encoded original image including R-G-B components, where a temporal residue is defined as a difference between an original image and a prediction image by estimating a motion between a current frame and a previous frame with respect to R-G-B components, and a prediction residue is defined as a difference between a value that an encoded residue of a predetermined color component is restored and transformed into a predetermined value and a residue of a component, which is not transformed, the method comprising: decoding a temporal residue of the G component from the encoded image including R-G-B components; transforming the decoded residue of the G component into a predetermined value; decoding prediction residues of the R-B components, which are not decoded; obtaining residues of the R-B components by adding the value transformed into the predetermined value to the prediction residues; and restoring the original image by adding a prediction image to the residues of the R-G-B components.

It is preferable that the motion estimation be performed in units of predetermined sized blocks.

It is preferable that the restored residue of the G component into the predetermined value using correlations among the R-G-B components.

It is preferable that the restored residue of the G component be transformed into the predetermined value using a linear transformation by multiplying the restored residue value of the G component by a predetermined value and adding an offset to the multiplied value.

It is preferable that the linear transformation be applied differently according to the block sizes used when a motion is compensated in units of blocks from the previous frame.

According to another aspect of the present invention, there is provided an image decoding method using residue prediction of an image, which decodes an encoded original image including R-G-B components, where a spatial residue is defined as a difference between an original image and a prediction image in which a prediction direction is estimated from pixels spatially close to a current frame with respect to R-G-B components, and a prediction residue is defined as a difference between a value that an encoded spatial residue of a predetermined color component is restored and transformed into a predetermined value and a residue of a component, which is not transformed, the method comprising: decoding a residue of the G component; transforming the decoded residue of the G component into a predetermined value including the decoded residue value of the G component; decoding prediction residues of the R-B components, which are not decoded; obtaining residues of the R-B components by adding the value transformed the residue of the G component into the predetermined value to the prediction residues; and restoring the original image by adding a prediction image to the residues of the R-G-B components.

It is preferable that the restored residue of the G component be transformed into the predetermined value using correlations among the R-G-B components.

It is preferable that the restored residue of the G component be transformed into the predetermined value using a linear transformation by multiplying the restored residue value of the G component by a predetermined value and adding an offset to the multiplied value.

It is preferable that the linear transformation be applied differently according to the spatial prediction directions of adjacent pixels used when residues of R-G-B components are obtained.

According to another aspect of the present invention, there is provided an image decoding method using residue prediction of an image, which decodes an R-G-B color image, where a residue is defined as a difference between the color image and a prediction image, and a prediction residue is defined as a difference between a residue of each component of the original image and a value that an encoded residue of a predetermined color component is restored and transformed into a predetermined value, the method comprising: (1) restoring a residue of a G component image from encoded image data; (2) obtaining residue images of R-B components from encoded image data and generating restored residue images of R-B components by adding the residue images of R-B components to a value obtained by linearly transforming the restored residue value obtained in step (1); (3) in an inter mode, restoring a color image of the R-G-B components by adding the residue values of the R-G-B components restored in steps (1) and (2) to a prediction image obtained by performing temporal motion compensation of components of a previous frame; and (4) in an intra mode, restoring a color image of the R-G-B components by adding the residue values of the R-G-B components restored in steps (1) and (2) to a prediction image obtained by estimating a prediction direction from spatially adjacent pixels.

It is preferable that step (1) comprise obtaining a restored residue image of the G component by performing inverse variable length decoding, an inverse quantization, and an inverse frequency transformation of the encoded data, and step (2) comprise obtaining the residue images of the R-B components by performing an inverse variable length decoding, an inverse quantization, and an inverse frequency transformation of the encoded data and generating the restored residue images of the R-B components by adding the residue images of the R-B components to a value obtained by linearly transforming the restored residue value obtained in step (1).

According to another aspect of the present invention, there is provided an image decoding apparatus using residue prediction of an image, which decodes an encoded original image including at least more than two components, where a residue is defined as a difference between the original image and a prediction image, and a prediction residue is defined as a difference between a residue of each component of the original image and a value that an encoded residue of a predetermined color component is restored and transformed into a predetermined value, the apparatus comprising: an inverse compression decoder, which decodes the encoded image data and generates a restored residue image of a predetermined color component of the image and restored prediction residues of components corresponding to residues, which are not restored; a residue transformer, which transforms the restored residue of the component generated by the inverse compression decoder into a predetermined value including the restored residue value of the component; a residue compensation unit, which generates restored residues by adding the prediction residues generated by the inverse compression decoder to the value transformed by the residue transformer; and an original image generator, which generates an original image by adding a prediction image to each of the residues generated by the residue compensation unit and the residue of the predetermined color component generated by inverse compression decoder.

According to another aspect of the present invention, there is provided an image decoding apparatus using residue prediction of an image, which decodes an encoded original image including R-G-B components, where a temporal residue is defined as a difference between an original image and a prediction image by estimating a motion between a current frame and a previous frame about each of the R-G-B components, and a prediction residue is defined as a difference between a value that an encoded residue of a predetermined color component is restored and transformed into a predetermined value and a residue of a component, which is not transformed, the apparatus comprising: a motion compensation unit, which generates a temporally motion compensated prediction image; an inverse compression decoder, which decodes the encoded image data and generates a restored residue image of the G component and restored prediction residues of the R-B components; a residue transformer, which performs a linear transformation on the restored residue of the G component generated by the inverse compression decoder; a residue compensation unit, which generates restored residues of the R-B components by adding the prediction residues of the R-B components generated by the inverse compression decoder to the value transformed by the residue transformer; and an original image generator, which generates an original image by adding a prediction image generated by the motion compensation unit to the residues of the R-B component generated by the residue compensation unit and the residue of the G component generated by inverse compression decoder.

According to another aspect of the present invention, there is provided an image decoding apparatus using residue prediction of an image, which decodes an encoded original image including R-G-B components, where a spatial residue is defined as a difference between an original image and a prediction image by estimating a prediction direction from pixels spatially close to a current frame with respect to the R-G-B components, and a prediction residue is defined as a difference between a value that an encoded spatial residue of a predetermined color component is restored and transformed into a predetermined value and a residue of a component, which is not transformed, the apparatus comprising: a spatial prediction unit, which generates a prediction image obtained by estimating a prediction direction from spatially adjacent pixels; an inverse compression decoder, which decodes the encoded image data and generates a restored residue image of the G component and restored prediction residues of the R-B components; a residue transformer, which performs a linear transformation on the restored residue of the G component generated by the inverse compression decoder; a residue compensation unit, which generates restored residues of the R-B components by adding the prediction residues of the R-B components generated by the inverse compression decoder to the value transformed by the residue transformer; and an original image generator, which generates an original image by adding a prediction image generated by the spatial prediction unit to the residues of the R-B components generated by the residue compensation unit and residue of the G component generated by inverse compression decoder.

According to another aspect of the present invention, there is provided an image decoding apparatus using residue prediction of an image, which decodes an encoded original image including at least more than two components, where a residue is defined as a difference between the original image and a prediction image, and a prediction residue is defined as a difference between a residue of each component of the original image and a value that an encoded residue of a predetermined color component is restored and transformed into a predetermined value, the apparatus comprising: a motion compensation unit, which generates a temporally motion compensated prediction image; a spatial prediction unit, which generates a prediction image obtained by estimating a prediction direction from spatially adjacent pixels; an inverse compression decoder, which decodes the encoded image data and generates a restored residue image of a G component and restored prediction residues of R-B components; a residue transformer, which performs a linear transformation on the restored residue of the G component generated by the inverse compression decoder; a residue compensation unit, which generates restored residues of R-B components by adding the prediction residues of R-B components generated by the inverse compression decoder to the value transformed by the residue transformer; and an original image generator, which generates an original image by adding the residues of R-B components generated by the residue compensation unit and the residue of the G component generated by inverse compression decoder to a prediction image generated by the motion compensation unit in a inter mode or to a prediction image generated by the spatial prediction unit in an intra mode.

It is preferable that the inverse compression decoder comprise: an entropy decoder, which performs entropy decoding of the encoded image data; an inverse quantizer, which inverse-quantizes the entropy decoded data; and an inverse frequency transformer, which generates the restored residue of the G component and the restored prediction residues of R-B components by performing an inverse frequency transformation on the inverse quantized data.

The present invention also provides a computer readable medium having recorded thereon a computer readable program for performing the methods described above.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will now be described more fully with reference to the accompanying drawings, in which exemplary embodiments of the invention are shown. According to the present invention, an R-G-B color image output from an image device can be directly compressed without transforming into a conventional Y-Cr-Cb image. One of three R, G and B components is encoded by a conventional method to code the Y component, and the other two components are encoded by predicting residue images generated from spatially adjacent pixels or temporally adjacent pixels using a restored residue value of the component correspond to the Y component.

Figure 1:
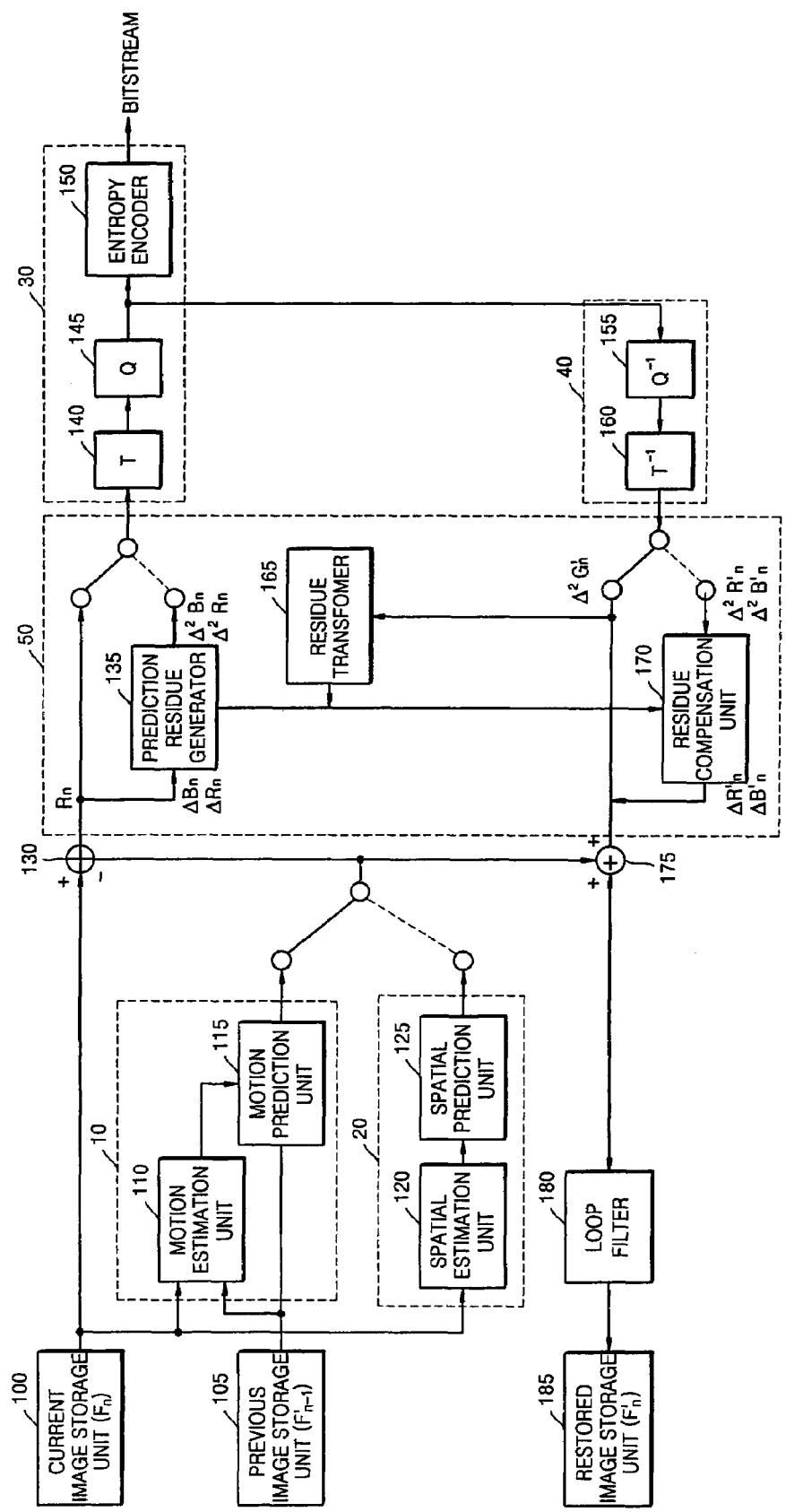
FIG. 1 is a block diagram of an image encoding apparatus using residue prediction of an image according to an embodiment of the present invention.

FIG. 1 is a block diagram of an image encoding apparatus using residue prediction of an image according to an embodiment of the present invention. In FIG. 1, a color image including green (G), red (R), and blue (B) components is encoded. First, terminology of residue and prediction residue is described. The residue is a difference between an original image and a prediction image. The prediction residue is a difference between a residue of each color component of the original image and a value obtained by restoring and transforming an encoded residue of a predetermined color component.

Referring to FIG. 1, the image encoding apparatus includes a current image storage unit 100, a previous image storage unit 105, a motion prediction (MP) image generator 10, a spatial prediction (SP) image generator 20, a residue generator 130, a compression encoder 30, a inverse compression decoder 40, a residue transformer 165, a prediction residue generator 135, a residue compensation unit 170, an original image generator 175, a loop filter 180, and a restored image storage unit 185.

The current image storage unit 100 receives and stores an R-G-B color image. The previous image storage unit 105 stores a previously decoded R-G-B color image.

Figure 4:
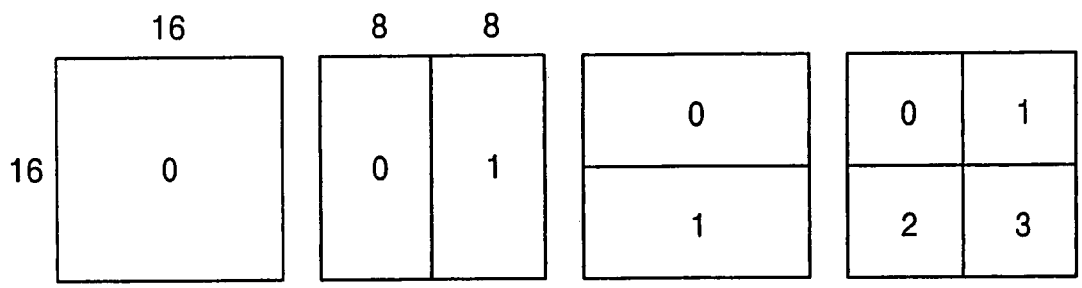
FIG. 4 illustrates a method of dividing a macro block used as a basic unit of motions for a motion estimation (ME) unit and a motion prediction (MP) unit in FIG. 1 and for temporal prediction in FIG. 3.
Figure 4:
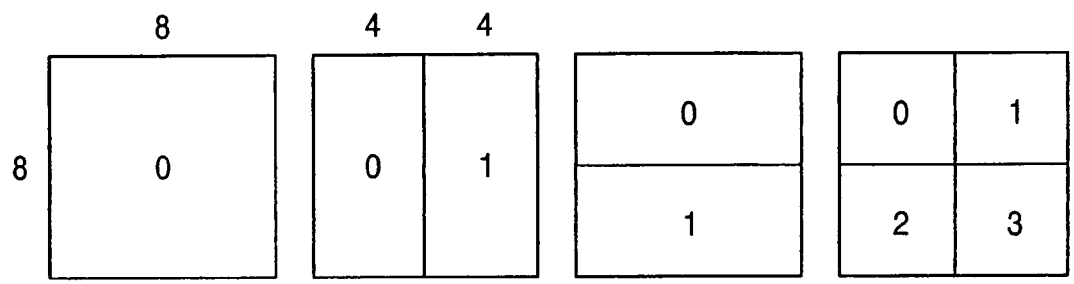

The MP image generator 10, which includes a motion estimation (ME) unit 110 and an MP unit 115, estimates a motion between a current frame and a previous frame in units of blocks and outputs a corresponding block. A block is basically a 16×16 macro block as shown in FIG. 4, and the MP image generator 10 divides the macro block into blocks with various sizes such as 16×16, 16×8, 8×16, and 8×8, calculates a motion vector of each block, and predicts a temporal image value. Especially, a fine motion can be sensed by dividing a 8×8 block into blocks with various sizes such as 8×8, 8×4, 4×8, and 4×4 again.

The ME unit 110 estimates a motion between a current frame and a previous frame in units of blocks. The MP unit 115 outputs a block corresponding to a motion vector generated by the ME unit 110.

The SP image generator 20, which includes a spatial estimation (SE) unit 120 and an SP unit 125, estimates a prediction direction from pixels spatially close to a pixel block of the current frame and outputs a corresponding block.

The SE unit 120 estimates a prediction direction from pixels spatially close to a pixel block of the current frame. The SP unit 125 outputs a block corresponding to a direction estimated by the SE unit 120. The SE and the SP as shown in FIG. 5 will be described at a later time.

The residue generator 130 generates a temporal residue corresponding to a difference between a block output from the MP image generator 10 and a corresponding block of the current frame in an inter mode, or generates a spatial residue corresponding to a difference between a block output from the SP image generator 20 and a corresponding block of the current frame in an intra mode.

The compression encoder 30, which includes a frequency transformer 140, a quantizer 145, and an entropy coder 150, compresses and encodes a residue of a G component generated by the residue generator 130 and prediction residues of R-B components generated by the prediction residue generator 135. The frequency transformer 140 compresses the residue of the G component generated by the residue generator 130 and the prediction residues of the R-B components generated by the prediction residue generator 135. The quantizer 145 quantizes data compressed by the frequency transformer 140. The entropy coder 150 performs entropy encoding of the quantized data.

The inverse compression decoder 40, which includes an inverse quantizer 155 and an inverse frequency transformer 160, decodes the compressed and encoded data and generates a restored residue on the G component and restored prediction residues of the R-B components. The inverse quantizer 155 performs an inverse quantization of the quantized data. The inverse frequency transformer 160 performs an inverse frequency transformation of the inverse quantized data and generates a restored residue on the G component and restored prediction residues of the R-B components.

The residue transformer 165 performs a linear transformation on the restored residue of the G component generated by the inverse compression decoder 40. The linearly transformed value also includes the restored residue value of the G component. The residue transformer 165 performs the linear transformation using correlations among components (R, G, and B components in the present embodiment) forming the original image. In detail, the linear transformation is performed by multiplying the restored residue value $\Delta G'_n$ of the G component by constant values a and c and adding the result value to offsets b and d. The values a, b, c, and d are determined by Equation 4 through 9, which will be described at a later time.

The prediction residue generator 135 generates differences $\Delta^2 R_n$ and $\Delta^2 B_n$ between the value transformed by the residue transformer 165 and each of the residues $\Delta R_n$ and $\Delta B_n$ of the R-B components generated by the residue generator 130.

The residue compensation unit 170 generates restored residues of the R-B components by adding the prediction residues of the R-B components generated by the inverse compression decoder 40 to the value transformed by the residue transformer 165.

The original image generator 175 generates the original image by adding the residues of the R-B components generated by the residue compensation unit 170 and the residue of the G component generated by the inverse compression decoder 40 to the prediction image generated by the MP image generator 10 in the inter mode, or generates the original image by adding the residues of the R-B components generated by the residue compensation unit 170 and the residue of the G component generated by the inverse compression decoder 40 to the prediction image generated by the spatial prediction image generator 20 in the intra mode. The loop filter 180 reduces a block effect of the restored image.

The present embodiment of the present invention will now be described in detail. A color input image $F_n$ of the image encoding apparatus is an R-G-B image. The image is handled in units of blocks in the image encoding apparatus. The image encoding apparatus predicts an image using the inter mode and the intra mode in order to raise encoding efficiency. In the inter mode, the ME unit 110 and the MP unit 115, which predict the image by estimating a motion from a previous frame image $F'_{n-1}$, are used. In the intra mode, the SE unit 120 and the SP unit 125, which predict the image from a spatially adjacent block, are used.

First, a residue value $R_n$ between an input image and an image predicted by the method described above is obtained by the residue generator 130. The residue values of three components of R, G, and B are obtained, respectively. To use correlations among the three components, a residue prediction method and a residue compensation method is used in the prediction residue generator 135 and the residue compensation unit 170. A residue value $\Delta G_n$ of the G component of the three components is discrete cosine transformed or discrete integer transformed in the frequency transformer 140, quantized in the quantizer 145, entropy encoded in the entropy coder 150, and compressed. The discrete cosine transform (DCT) refers to an MPEG-4 part 2 standard of ISO/IEC, and the discrete integer transform refers to an AVC/H.264 standard of Joint Video Team of ISO/IEC MPEG and ITU-T VCEG. A restored residue value $\Delta G'_n$ of the G component is obtained by that the compressed value is inverse quantized in the inverse quantizer 155 and inverse discrete cosine transformed or inverse discrete integer transformed in the inverse frequency transformer 160 so that the compressed value is used for prediction in a spatially adjacent block or a temporally future image.

Residue values of the other two components of R and B are encoded using the restored residue value $\Delta G'_n$ of the G component not directly encoded. In more detail, the prediction residue $\Delta^2 B_n$ of the B component and the prediction residue $\Delta^2 R_n$ of the R component are generated through the prediction residue generator 135. The prediction residues $\Delta^2 B_n$ and $\Delta^2 R_n$ are generated by subtracting a value generated by linearly transforming the restored residue value $\Delta G'_n$ of the G component from residues $\Delta B_n$ and $\Delta R_n$ of R-B components generated by the residue generator 130. In the value generated by linear transforming the restored residue value $\Delta G'_n$ of the G component, the restored residue value $\Delta G'_n$ of the G component is also included. The prediction residues are discrete cosine transformed or discrete integer transformed in the frequency transformer 140, quantized in the quantizer 145, entropy encoded in the entropy coder 150, and compressed.

For a prediction like in a case of the residue value of the G component, restored prediction residue values $\Delta^2 B'_n$ and $\Delta^2 R'_n$ are obtained from the compressed values by performing an inverse quantization in the inverse quantizer 155 and an inverse discrete cosine transformation or an inverse discrete integer transformation in the inverse frequency transformer 160. Restored residue values $\Delta B'_n$ and $\Delta R'_n$ are obtained by adding the restored prediction residue values $\Delta^2 B'_n$ and $\Delta^2 R'_n$ to the value transformed by the residue transformer 165 in the residue compensation unit 170.

An image $F'_n$ to be restored in an image decoding apparatus can be obtained by that the restored residue values $\Delta G'_n$, $\Delta B'_n$ and $\Delta R'_n$ of the three components are added to a block value predicted by the ME and MP units 110 and 115 in the inter mode or the SE and SP units 120 and 125 in the intra mode through the original image generator 175 and passed through the loop filter 180 reducing the block effect. The mage $F'_n$ is stored in the restored image storage unit 185 and used as a previous image in the ME unit 110, the MP unit 115, the SE unit 120, and SP unit 125.

A portion indicated by a reference number 50 in FIG. 1 is a core portion using a color component residue prediction method used for raising coding efficiency of the R-G-B components in the present invention.

In the method of and apparatus for encoding an image using a residue of a color image by the present invention described above, the components are input in order of G, R and B, and an image is encoded by obtaining the residue of the G component at first and then the prediction residues of the R-B components. However, the encoding method is effective when the G-component has most of the image information to be encoded. Therefore, when the R-component has most of the image information to be encoded, that is, when the R-component is a dominant component, in the present invention, a residue of the R-component is obtained, and prediction residues of the G-B components can be obtained using the residue of the R-component. Likewise, when the B-component is a dominant component, a residue of the B-component is obtained, and prediction residues of the R-G components can be obtained using the residue of the B-component by equally applying the spirit of the present invention.

Also, the embodiment described above is applied to a color image including R, G, and B components, however, it can be equally applied to a Y-Cr-Cb or X-Y-Z image.

Figure 2:
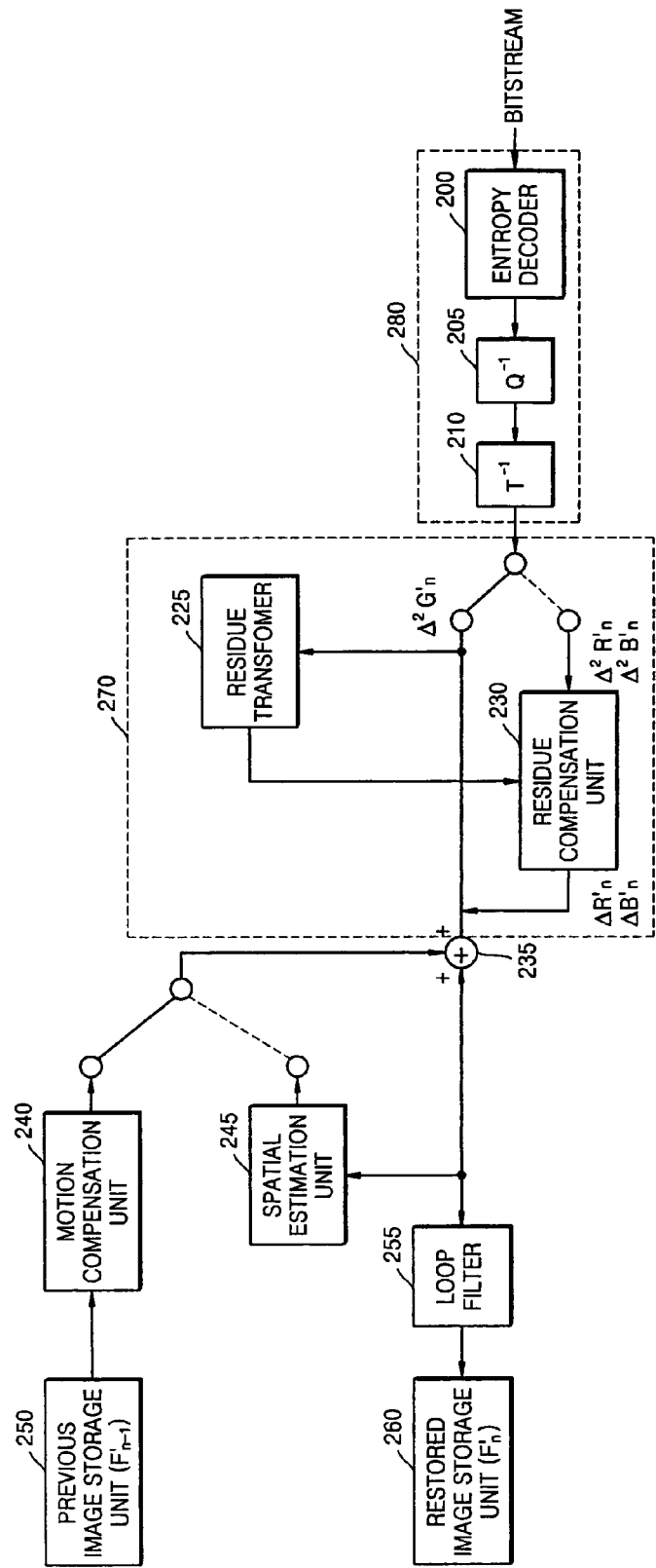
FIG. 2 is a block diagram of an image decoding apparatus using residue prediction of an image according to an embodiment of the present invention.

FIG. 2 is a block diagram of an image decoding apparatus using residue prediction of an image according to an embodiment of the present invention.

The image decoding apparatus restores an image from a compressed bitstream by passing through an opposite process to the encoding process of FIG. 1.

In FIG. 2, an encoded color R-G-B image is decoded. The image decoding apparatus includes a motion compensation unit 240, a spatial prediction unit 245, an inverse compression decoder 280, a residue transformer 225, a residue compensation unit 230, an original image generator 235, a loop filter, and a restored image storage unit 260.

The motion compensation unit 240 generates a temporally motion compensated prediction image. The spatial prediction unit 245 generates a prediction image obtained by estimating a prediction direction from spatially adjacent pixels.

The inverse compression decoder 280, which includes an entropy decoder 200, an inverse quantizer 205, and an inverse frequency transformer 210, decodes the encoded image data and generates a restored residue image of the G component and restored prediction residues of the R-B components. The entropy decoder 200 performs entropy decoding of the encoded image data. The inverse quantizer 205 inverse-quantizes the entropy decoded data. The inverse frequency transformer 210 generates the restored residue $\Delta G'_n$ of the G component and the restored prediction residues $\Delta^2 B'_n$ and $\Delta^2 R'_n$ of the R-B components by performing inverse frequency transformation of the inverse quantized data.

The residue transformer 225 performs linear transformation of the restored residue of the G component generated by the inverse compression decoder 280. The linear transformed value also includes the restored residue value of the G component is also included. The residue transformer 225 performs the linear transformation using correlations among components (R, G, and B image in the present embodiment) configuring the original image. In detail, the linear transformation is performed by multiplying the restored residue value $\Delta G'_n$ of the G component by constant values a and c and adding the result value to offsets b and d. The values a, b, c, and d are determined by Equation 4 through 9, which will be described at a later time.

The residue compensation unit 230 generates restored residues $\Delta B'_n$ of the R-B components and $\Delta R'_n$ by adding the prediction residues $\Delta^2 B'_n$ and $\Delta^2 R'_n$ of the R-B components restored by the inverse compression decoder 280 to the value transformed by the residue transformer 225.

The original image generator 235 generates an original image in which the block effect exists by adding the residues $\Delta B'_n$ and $\Delta R'_n$ of the R-B components restored by the residue compensation unit 230 and the residue $\Delta G'_n$ of the G component generated by the inverse compression decoder 280 to a prediction image generated by the motion compensation unit 240 in the inter mode, or generates an original image in which the block effect exists by adding the residues $\Delta B'_n$ and $\Delta R'_n$ of the R-B components restored by the residue compensation unit 230 and the residue $\Delta G'_n$ of the G component generated by the inverse compression decoder 280 to a prediction image generated by the spatial prediction unit 245 in the intra mode.

An original image $F'_n$ in which the block effect is reduced can be obtained by passing the original image in which the block effect exists through the loop filter 255 reducing the block effect.

An operation of the image decoding apparatus will now be described in more detail. The restored residue value $\Delta G'_n$ of the G component is obtained by passing the compressed data through the entropy decoder 200, inverse quantizer 205, and the inverse frequency transformer 210. In case of the inter mode, the restored value of the G component is obtained by adding the residue value of the G component to a prediction value of a previous image $F'_{n-1}$ generated by the motion compensation unit 240, and in case of the intra mode, the restored value of the G component is obtained by adding the residue value of the G component to a prediction value of a spatially adjacent block generated by the spatial prediction unit 245. The restored image $F'_n$ of the G component is obtained by passing the restored residue value of the G component through the loop filter 255 reducing the block effect.

In order to restore the R and B components, the restored prediction residue values $\Delta^2 B'_n$ and $\Delta^2 R'_n$ of the R-B components are obtained by that the bitstream is entropy decoded by the entropy decoder 200, inverse quantized by the inverse quantizer 205, and inverse discrete cosine transformed or inverse discrete integer transformed by the inverse frequency transformer 210. The restored residue values $\Delta B'_n$ and $\Delta R'_n$ of the R-B components are obtained by adding the restored prediction residue values $\Delta^2 B'_n$ and $\Delta^2 R'_n$ to the value transformed by the residue transformer 225 in the residue compensation unit 230.

The restored image $F'_n$ of the R-B components can be obtained by that the restored residue values $\Delta B'_n$ and $\Delta R'_n$ of the R-B components are added to a block value predicted by the motion compensation unit 240 in the inter mode or the spatial estimation unit 245 in the intra mode through the original image generator 235 and passed through the loop filter 255 reducing the block effect.

In the method of and apparatus for decoding an image using a residue of a color image by the present invention described above, the components are input in order of G, R and B, the residue of the G component is decoded at first, the prediction residues of the R-B components are decoded, and the original image is restored by obtaining the residues of the R-B components using the residue of the G component. However, the decoding method is effective when the G component has most of the image information. Therefore, when the R component has most of the image information to be encoded, that is, when the R component is a dominant component, in the present invention, a residue of the R component is obtained, and prediction residues of the G-B components can be obtained using the residue of the R component. Likewise, when the B component is a dominant component, a residue of the B component is obtained, and prediction residues of the R-G components can be obtained using the residue of the B component by applying the present invention.

Also, the embodiment described above is applied to a color image including R, G, and B components, however, it can be equally applied to a Y-Cr-Cb or X-Y-Z type image.

Figure 3:
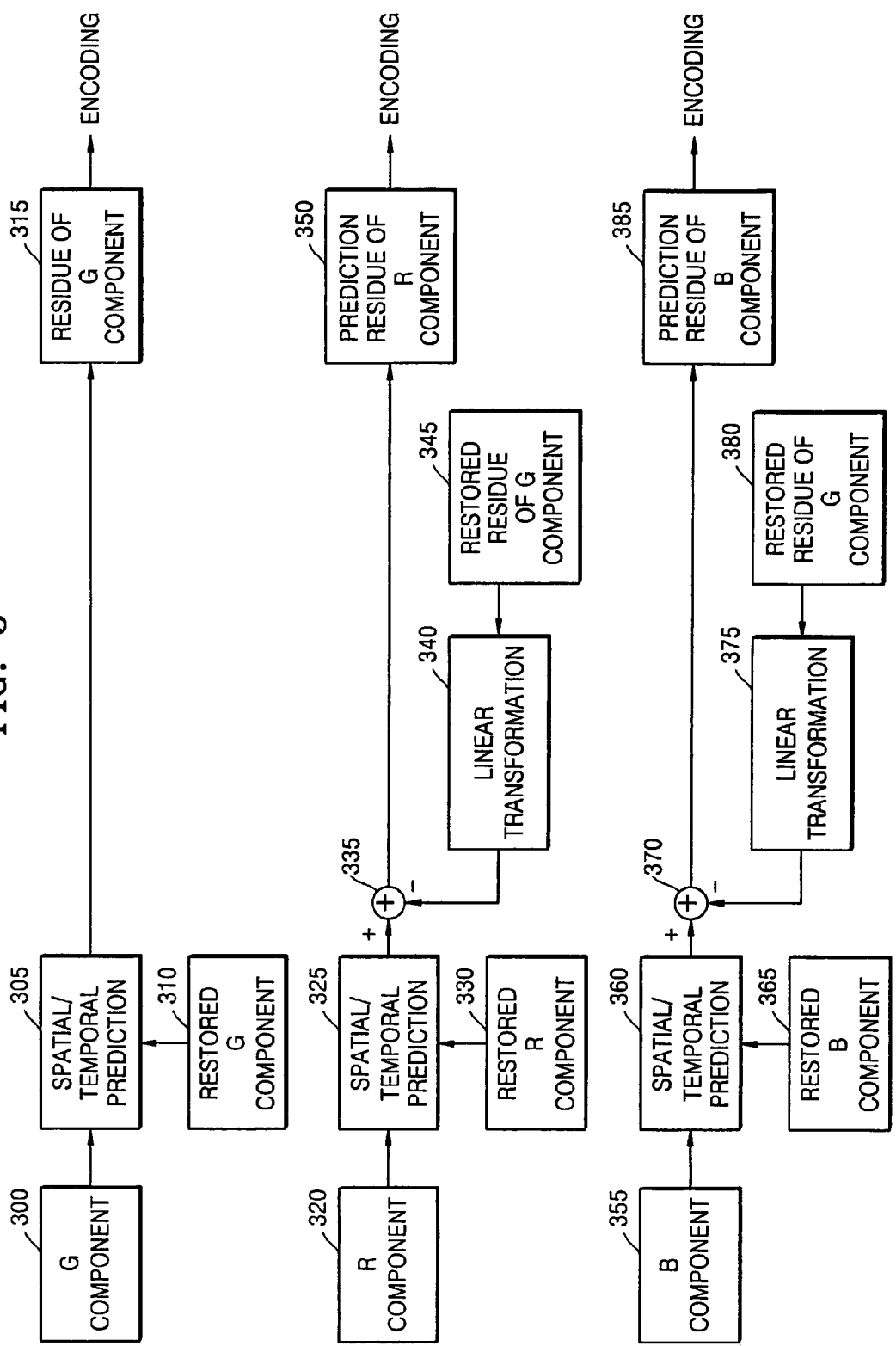
FIG. 3 is a block diagram illustrating a method of performing residue prediction of an R-G-B color image according to an embodiment of the present invention.

FIG. 3 is a block diagram illustrating a method of performing residue prediction of an R-G-B color image according to an embodiment of the present invention. That is, a block corresponding to the reference number 50 of FIG. 1 and a block corresponding to a reference number 270 of FIG. 2 will now be described in detail.

First, a residue 315 of a G component is obtained by subtracting a value predicted using a spatially adjacent image or a temporally adjacent image 310 from the G component 300 like in a conventional encoder. The residue value of the G component can be represented by Equation 1.

$$\Delta G = G - G_p \quad \text{[Equation 1]}$$

Here, $G_p$ corresponds to a reference number 310 of FIG. 3. The residue value of the G component is entropy encoded.

At this time, correlations among the G, R, and B components are still high. In order to use the similarity among the components, temporal/spatial prediction 325 and 360 of the R and B components is performed like in the case of the G component. Residue values of the R-B components as prediction results are represented by Equation 2 and Equation 3.

$$\Delta R = R - R_p \quad \text{[Equation 2]}$$

$$\Delta B = B - B_p \quad \text{[Equation 3]}$$

Here, $R_p$ and $B_p$ are the residue values 330 and 365 of the R-B components, respectively, predicted using spatially adjacent images or temporally adjacent images. Residue values 350 and 385 are predicted from the residue values $\Delta R$ and $\Delta B$ once more using linear transformed values 340 and 375 of restored residues 345 and 380 of the G component by Equation 4 and Equation 5.

$$\Delta^2 R_n = \Delta R - f(\Delta G) = \Delta R - (a \cdot \Delta G + b) \quad \text{[Equation 4]}$$

$$\Delta^2 B_n = \Delta B - f(\Delta G) = \Delta B - (c \cdot \Delta G + d) \quad \text{[Equation 5]}$$

Since a data amount to be encoded is reduced when the prediction residue values 350 and 385 are used in comparison to the case when temporal/spatial prediction errors of the R-B components are used, encoding efficiency is improved. The reduction in the data amount is because $\Delta R$ and $\Delta B$ can be approximated as functions of $\Delta G$ by representing correlations between $\Delta G$ and $\Delta R$ and between $\Delta G$ and $\Delta B$ with a linear function since correlations among $\Delta G$, $\Delta R$, and $\Delta B$ is high. Here, a and b are respectively a slope and a deviation of the linear function approximated when the residue of the R component is predicted using the residue of the G component, and c and d are respectively a slope and a deviation of the linear function approximated when the residue of the B component is predicted using the residue of the G component. The a, b, c, and d can be represented by Equation 6, Equation 7, Equation 8, and Equation 9, respectively.

$$a = \frac{cov(\Delta G, \Delta R)}{\sigma^2_{\Delta G}} \quad \text{[Equation 6]}$$

$$b = E(\Delta R) - a \cdot E(\Delta G) \quad \text{[Equation 7]}$$

$$c = \frac{cov(\Delta G, \Delta B)}{\sigma^2_{\Delta G}} \quad \text{[Equation 8]}$$

$$d = E(\Delta B) - c \cdot E(\Delta G) \quad \text{[Equation 9]}$$

Here, cov(•) represents covariance, E(•) represents average of values, and $\sigma^2$ represents variance. Also, a and c may be equal to 1, and b and d may be equal to 0. That is, at this time, the function value $f(\Delta G)$ of $\Delta G$ becomes the restored residue value of the G component.

FIG. 4 illustrates a method of dividing a macro block used as a basic unit of motions for the ME unit 110 and the MP unit 115 in FIG. 1 and for the temporal prediction 305, 325, and 360 in FIG. 3. The method is in accordance with in encoding standards such as ISO/IEC 14496-10 2002 and ITU-T Rec H.264. Different from other methods, a macro block can be divided in blocks of various sized block dividing is permitted in the method. Basically, a 16×16 macro block is divided into various sizes such as 16×16, 16×8, 8×16, and 8×8, a motion vector of each block is obtained, and a temporal image value is predicted. Especially, a fine motion can be exactly sensed by dividing an 8×8 block into blocks with various sizes such as 8×8, 8×4, 4×8, and 4×4 again.

Figures 5A, 5B:
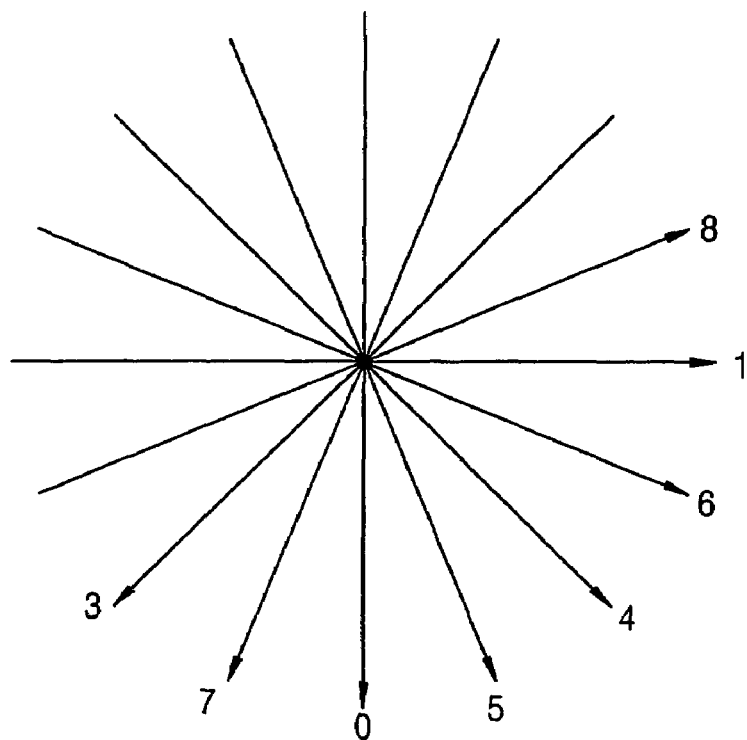
FIG. 5A illustrates positions of adjacent pixels for a spatial estimation unit and a spatial prediction unit in FIG. 1 and for spatial prediction in FIG. 3 and pixel positions of a current block to be predicted.
FIG. 5B illustrates 9 prediction directions from 0 to 8 for predicting a current block by projecting on spatially adjacent pixels.

FIG. 5A illustrates positions of adjacent pixels for the SE unit 120 and the SP unit 125 of FIG. 1 and for spatial prediction 305, 325, and 360 of FIG. 3 and illustrates pixel positions of a current block to be predicted. The method used in FIG. 5A is the same as a method used in standard encoding methods such as ISO/IEC 14496-10 2002 and ITU-T Rec H.264. In FIG. 5A, to predict a 4×4 block data $P_a, P_b, \ldots, P_q$, spatially adjacent data $P_0, P_1, \ldots, P_2$, which are encoded and restored previously, are used. FIG. 5B illustrates 9 prediction directions from 0 to 8 for predicting a current block by projecting a line from any one of the pixels in the current block to any one of the adjacent pixels. For example, in a case of a 0 direction, by projecting adjacent pixel values $P_1, P_2, P_3$, and $P_4$ onto the vertical direction, $P_a, P_e, P_i$, and $P_m$ are predicted as $P_1, P_b, P_f, P_j$, and $P_a$ are predicted as $P_2, P_c, P_g, P_k$, and $P_o$ are predicted as $P_3$, and $P_d, P_h, P_l$, and $P_q$ are predicted as $P_4$. Likewise, other directions are also predicted through projection.

Figure 6:
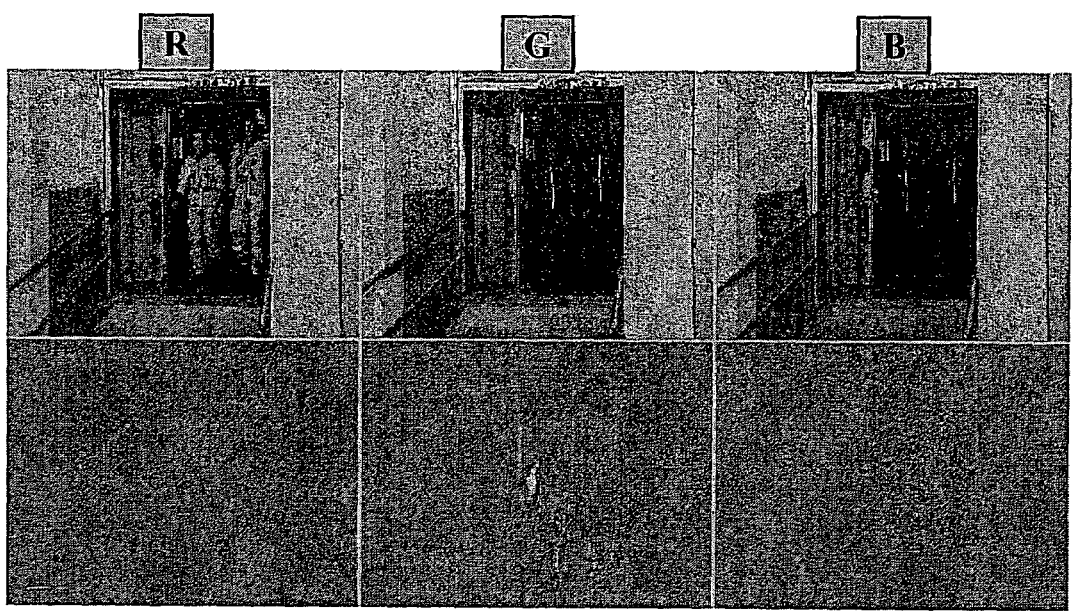
FIG. 6 illustrates R-G-B crew (1280×720) images and residue images by temporal prediction of an ME unit and an MP unit of FIG. 1 against the R-G-B crew (1280×720) images.

FIG. 6 illustrates R-G-B crew (1280×720) images and residue images obtained by temporal prediction in the ME unit 110 and the MP unit 115 of FIG. 1 on the R-G-B crew (1280×720) images. Referring to FIG. 6, similarity among the R-G-B images is low, however, similarity among the residue images is pretty high in most regions. With regard to the residue values generated by prediction in the SE unit 120 and the SP unit 125 of FIG. 1, similarity among the R-G-B components is also pretty high.

Figure 7A:
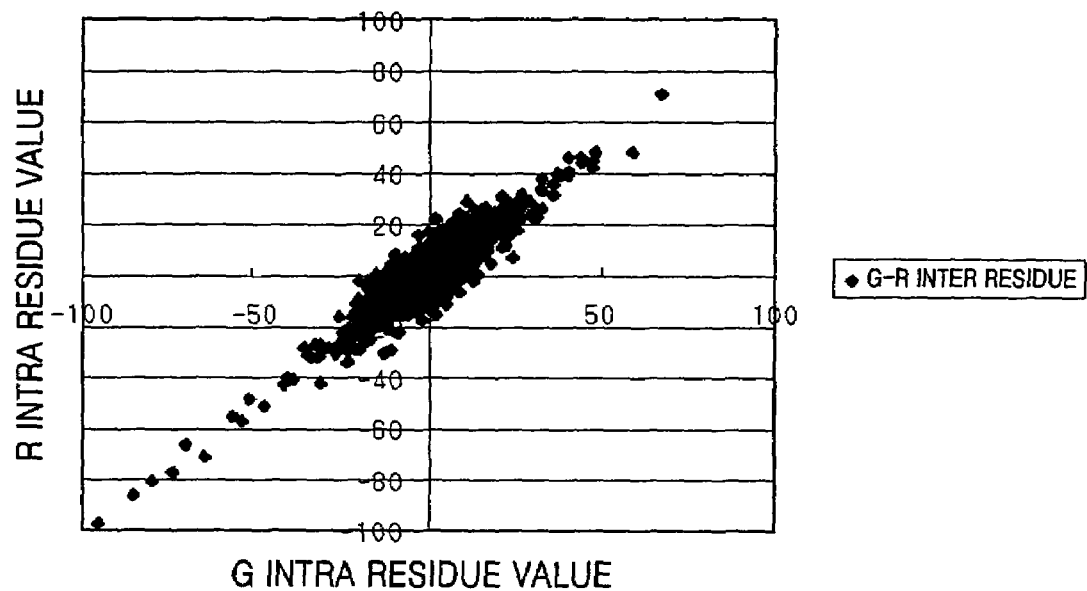
FIGS. 7A-7D illustrate correlations between residues obtained by temporal/spatial prediction of R-G-B color images.
Figure 7B:
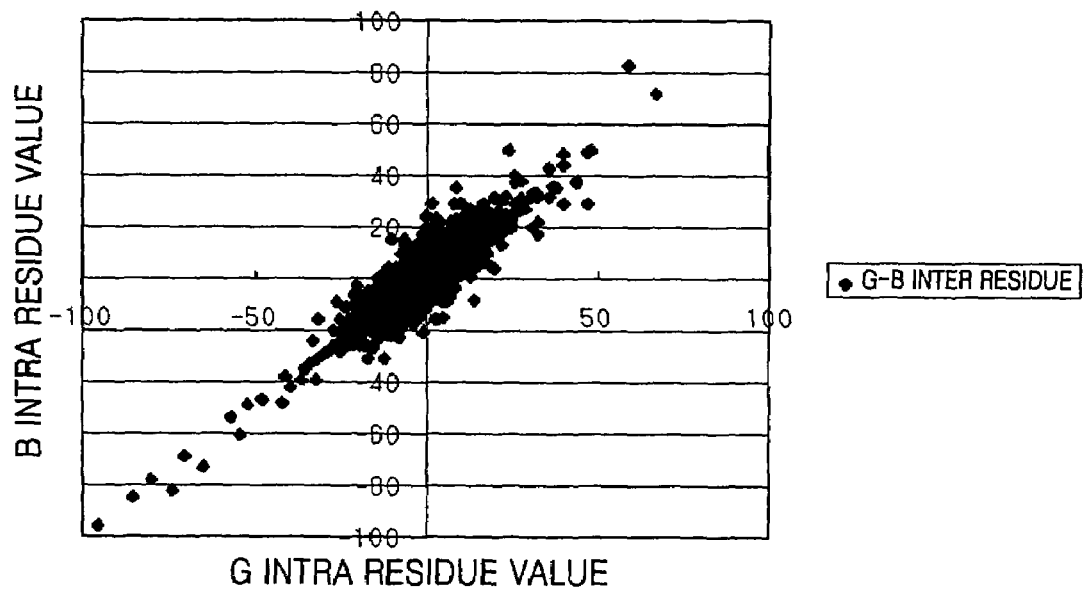
Figure 7C:
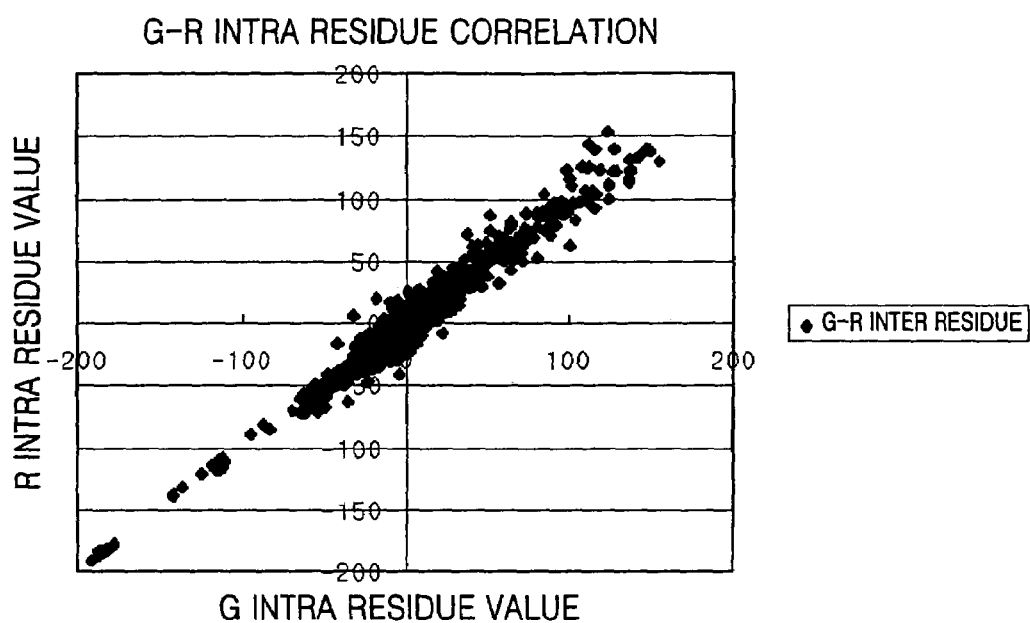
Figure 7D:
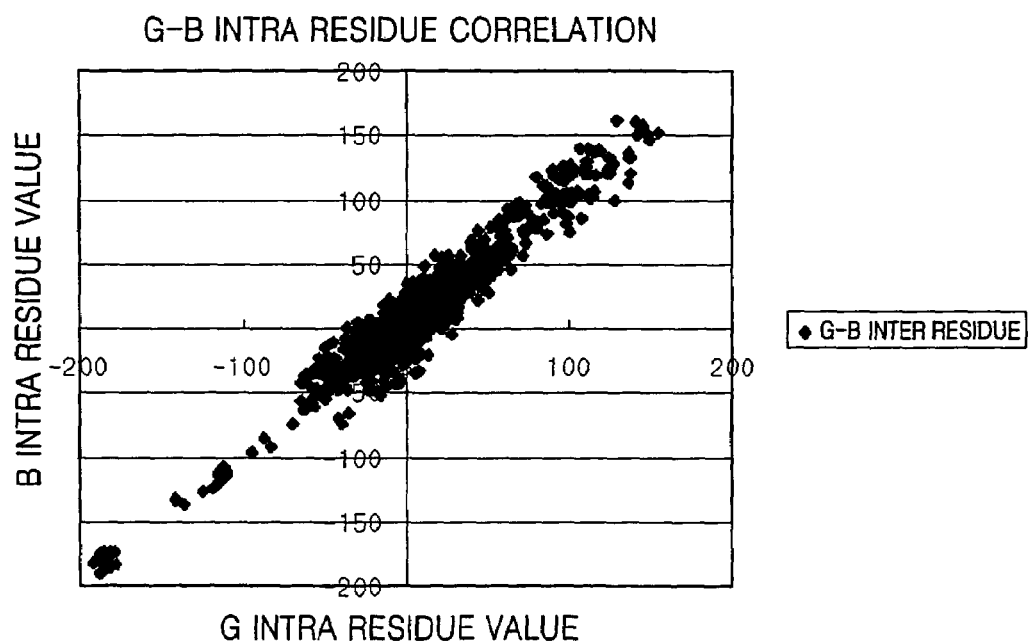

FIGS. 7A-7D illustrate correlations between residues by temporal/spatial prediction of R-G-B color images. The graphs of FIGS. 7A and 7B show correlations between residue values of components by temporal prediction in the ME unit 110 and the MP unit 115 of FIG. 1. The graph of FIG. 7A shows values with the residue value of the G component as the horizontal axis and the residue value of the R component as the vertical axis. The graph of FIG. 7B shows values with the residue value of the G component as the horizontal axis and the residue value of the B component as the vertical axis. Referring to the graphs of FIGS. 7A and 7B, correlations between the residue value of the R or B component and the residue value of the G component is high, and the residue values of the R or B component can be predicted by linear regression of the residue values of the G component. The graphs of FIGS. 7C and 7D show correlations between residue values of components by spatial prediction in the SE unit 120 and the SP unit 125 of FIG. 1. The graphs of FIGS. 7C and 7D show correlations between the residue value of the R or B component and the residue value of the G component, respectively, like in the graphs of FIGS. 7A and 7B. In the spatial prediction method, also, correlations between the residue value of the R or B component and the residue value of the G component is high, and the residue value of the R or B component can be predicted by linear regression of the residue value of the G component. The linear regression between residues of the R-G-B components can be represented by Equation 6, Equation 7, Equation 8, and Equation 9.

Figure 8A:
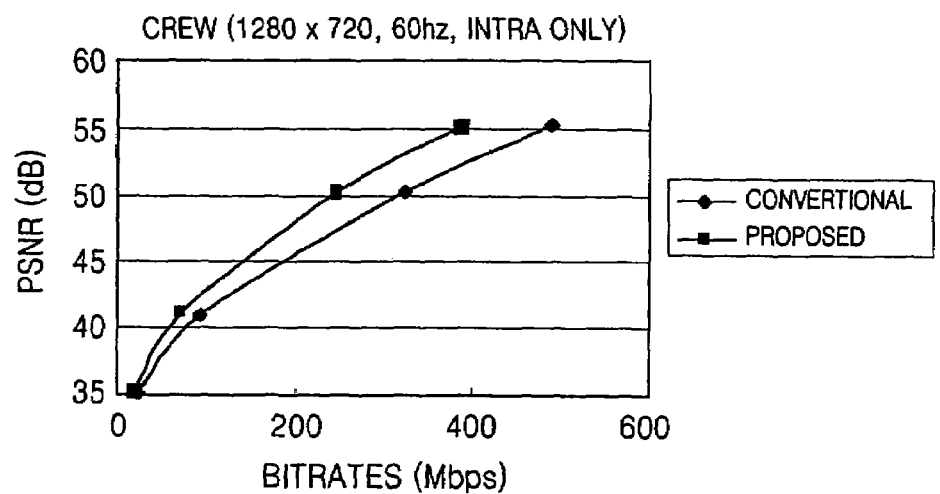
FIGS. 8A-8B illustrate a comparison of a decoding result (indicated as 'proposed') obtained by a method of prediction among residues of R-G-B components by temporal/spatial prediction of components according to the present invention and a decoding result (indicated as 'conventional') obtained by a conventional method.
Figure 8B:
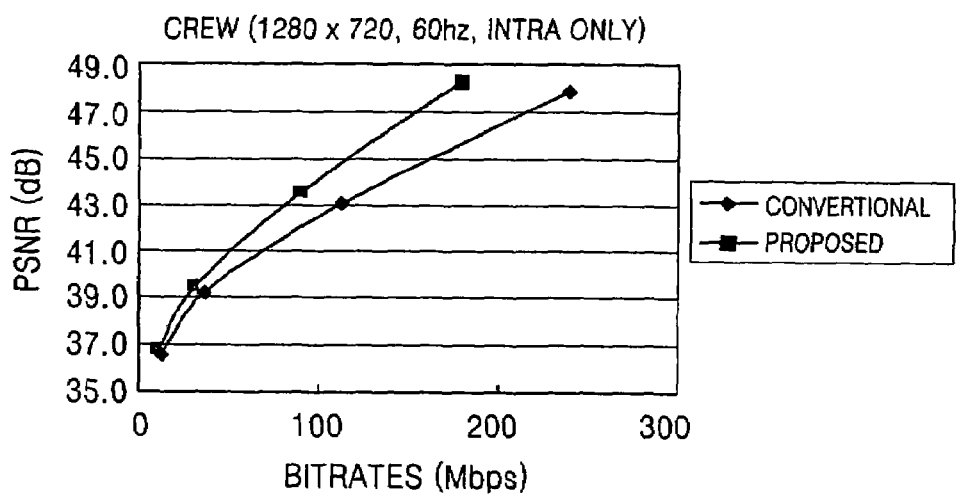

FIGS. 8A-8B illustrate a comparison result of a decoding result (indicated as 'proposed') obtained by a method of prediction between residues of the R-G-B color components by temporal/spatial prediction of components according to the present invention and a decoding result (indicates as 'conventional') obtained by a conventional method. Referring to FIGS. 8A-8B, the comparison results for a crew (1280×720, 60 Hz) image, which is a high definition (HD) image, are shown as a peak signal-to-noise ratio (PSNR) at 4 bitrates.

The graph of FIG. 8A shows a result when only spatial prediction in the intra mode is used, and the graph of FIG. 8B shows a result when all temporal/spatial prediction is used. Referring to FIGS. 8A-8B, a gain of more than 3-4 dB is obtained at the same bitrate.

The embodiments described above present cases where the inter mode and the intra mode are used together. However, only one of the inter mode and the intra mode may be used, case that can be easily understood by those skilled in the art.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, according to the present invention, since prediction residues are encoded and decoded using correlations between residues of image components and image components, data amount is highly reduced.

Also, since there is no quality loss in a picture generated by directly encoding in an R-G-B image without transforming it into a Y-Cr-Cb image, high quality image information is obtained. Therefore, the present invention is suitable for applications in digital cinema and the digital archive requiring high quality image.

Also, by applying the method of the present invention, wherein predictions between residues R-G-B components are obtained by temporal/spatial prediction of components, a gain of more than 3 dB PSNR is obtained at the same bitrate in comparison to a conventional method.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An image encoding method using residue prediction of an image, which encodes an original image including at least more than two components, the method comprising:

obtaining a residue corresponding to a difference between the original image and a prediction image with respect to each component of the original image;

encoding the residue of a predetermined component of the original image;

restoring the encoded residue of the predetermined component and transforming the restored residue into a predetermined value including the restored residue value; and encoding prediction residues corresponding to differences between each of residues of components of the original image, which are not encoded, and the residue, which is restored and transformed into the predetermined value.

2. The method of claim 1, wherein the residue is transformed into the predetermined value using correlations among components of the original image.

3. The method of claim 1, wherein the original image is one of an R-G-B image, a Y-Cb-Cr image, and an X-Y-Z image.

4. An image encoding method using residue prediction of an image, the method comprising:

obtaining a temporal residue corresponding to a difference between an original image and a prediction image with respect to R-G-B components of a color image by estimating a motion between a current frame and a previous frame;

encoding a residue of the G component;

restoring the encoded residue of the G component and transforming the restored residue of the G component into a predetermined value including the restored residue value of the G component; and encoding prediction residues corresponding to differences between each of residues of the R-B components of the original image, which are not encoded, and the residue of the G component transformed into the predetermined value.

5. The method of claim 4, wherein the motion estimation is performed in units of predetermined sized blocks.

6. The method of claim 4, wherein the restored residue of the G component is transformed into the predetermined value using correlations among the R-G-B components.

7. The method of claim 4, wherein the restored residue of the G component is transformed into the predetermined value using a linear transformation by multiplying the restored residue value of the G component by a predetermined value and adding the multiplied value to an offset.

8. The method of claim 7, wherein the linear transformation differently linear transforms block sizes used when a motion is compensated in units of blocks from the previous frame.

9. The method of claim 4, wherein the obtaining the residue of the G color component and the obtaining and encoding the prediction residues of the R and B color components using the residue of the G color component comprises obtaining a residue of the R color component and obtaining and encoding prediction residues of the G and B color components using the residue of the R color component.

10. The method of claim 4, wherein the obtaining the residue of the G component and the obtaining and encoding the prediction residues of the R and B components using the residue of the G color component comprises obtaining a residue of the B component and obtaining and encoding prediction residues of the G and R components using the residue of the B component.

11. An image encoding method using residue prediction of an image, the method comprising:

obtaining a spatial residue corresponding to a difference between an original image and a prediction image with respect to R-G-B components of a color image by estimating a predicted direction from pixels spatially close to a pixel block of a current frame;

encoding the residue of the G component;

restoring the encoded residue of the G component and transforming the restored residue of the G component into a predetermined value including the restored residue value of the G component; and encoding prediction residues corresponding to differences between each of residues of the R-B components of the original image, which are not encoded, and the residue of the G component transformed into the predetermined value.

12. The method of claim 11, wherein the restored residue of the G component is transformed into the predetermined value using correlations among the R, G, and B components.

13. The method of claim 11, wherein the restored residue of the G component is transformed into the predetermined value using a linear transformation by multiplying the restored residue value of the G component by a predetermined value and adding the multiplied value to an offset.

14. The method of claim 13, wherein the linear transformation differently linear transforms spatially predicted directions used when residues of R-G-B components are obtained.

15. The method of claim 11, wherein the obtaining the residue of the G component and the obtaining and encoding the prediction residues of the R and B components using the residue of the G component comprises obtaining a residue of the R component and obtaining and encoding prediction residues of the G and B components using the residue of the R component.

16. The method of claim 11, wherein the obtaining the residue of the G component and the obtaining and encoding the prediction residues of the R and B components using the residue of the G component comprises obtaining a residue of the B component and obtaining and encoding prediction residues of the G and R components using the residue of the B component.

17. An image encoding method using residue prediction of an image, which encodes an R-G-B color image, the method comprising:
(1) in an inter mode, obtaining a prediction image by estimating a motion in units of predetermined sized blocks between a previous frame and a current frame with respect to each color component and generating a temporal residue by subtracting the prediction image from an original image;
(2) in an intra mode, obtaining a prediction image by estimating a predicted direction from spatially adjacent pixels of a pixel block of a current frame of each color component and generating a spatial residue by subtracting the prediction image from an original image;
(3) encoding the residue of the G component and restoring the encoded residue of the G component;
(4) obtaining prediction residues of the R-B components using the residue of the C component restored in step (3) and the residues of the R-B components generated in step (1) or (2);
(5) encoding the prediction residue values of the R-B components obtained in step (4) and restoring the encoded prediction residue images of the R-B components; and
(6) obtaining restored residue values of the R-G-B components using the restored residue image of the G component and the restored prediction residue images of the R-B components and generating restored images of the R-G-B components by adding the restored residue values of the R-G-B components to the prediction image value.

18. The method of claim 17, wherein step (3) comprises:
performing a frequency transformation, a quantization, and a variable length encoding of the residue of the G component to compress the residue of the G component and obtaining a restored residue image of the G component by performing an inverse quantization and an inverse frequency transformation on the quantized value again, and
step (5) comprises:
performing a frequency transformation, a quantization, and a variable length encoding of the prediction residue values of the R-B components obtained in step (4) and obtaining restored prediction residue images of the R-B components by performing an inverse quantization and an inverse frequency transformation on the quantized values again.

19. The method of claim 17, wherein step (4) comprises:
performing a linear transformation by multiplying the restored residue value of the G component by a predetermined value and adding the multiplied value to an offset; and
obtaining prediction residues corresponding to differences between each of the residues of the R-B components of the original image, which are not encoded, and the linear transformed residue of the G component.

20. An image encoding apparatus using residue prediction of an image, which encodes an original image including at least more than two components, the apparatus comprising:
a residue generator, which generates a difference between the original image and a prediction image with respect to each component of the original image;
a residue encoder, which encodes a residue of a predetermined component of the original image generated by the residue generator and prediction residues generated by a prediction residue generator;
a residue transformer, which restores the encoded residue of the predetermined component and transforms the restored residue into a predetermined value including the restored residue value; and
the prediction residue generator, which generates differences between each of residues of components of the original image, which are not encoded, and the residue, which is restored and transformed into the predetermined value.

21. An image encoding apparatus using residue prediction of an image, which encodes an R-G-B color image, the apparatus comprising:
a motion prediction image generator, which estimates a motion between a current frame and a previous frame in units of predetermined sized blocks and outputs a corresponding block;
a residue generator, which generates a temporal residue corresponding to a difference between an image generated by the motion prediction image generator and the corresponding block of the current frame with respect to R-G-B components of the color image;
a compression encoder, which compresses and encodes a residue of the G component generated by the residue generator and prediction residues of the R-B components generated by a prediction residue generator;
an inverse compression decoder, which decodes the compressed and encoded data and generates a restored residue of the G component and restored prediction residues of the R-B components;
a residue transformer, which transforms the restored residue of the G component into a predetermined value including the restored residue value of the G component using correlations among the R-G-B components; and
a prediction residue generator, which generates differences between each of the residues of the R-B components generated by the residue generator and the residue of the G component transformed by the residue transformer.

22. An image encoding apparatus using residue prediction of an image, which encodes an R-G-B color image, the apparatus comprising:
a spatial prediction image generator, which estimates a prediction direction from pixels spatially close to a pixel block of a current frame and outputs a corresponding block;

a residue generator, which generates a spatial residue corresponding to a difference between an image generated by the spatial prediction image generator and the corresponding block of the current frame with respect to R-G-B components of the color image;

a compression encoder, which compresses and encodes a residue of the G component generated by the residue generator and prediction residues of the R-B components generated by a prediction residue generator;

an inverse compression decoder, which decodes the compressed and encoded data and generates a restored residue of the G component and restored prediction residues of the R-B components;

a residue transformer, which transforms the restored residue of the G component into a predetermined value including the restored residue value of the G component using correlations among the R-G-B components; and a prediction residue generator, which generates differences between each of the residues of the R-B components generated by the residue generator and the residue of the G component transformed by the residue transformer.

23. An image encoding apparatus using residue prediction of an image, which encodes an R-G-B color image, the apparatus comprising:

a motion prediction image generator, which estimates a motion between a current frame and a previous frame in units of predetermined sized blocks and outputs a corresponding block;

a spatial prediction image generator, which estimates a prediction direction from pixels spatially close to a pixel block of a current frame and outputs a corresponding block;

a residue generator, which generates a temporal residue corresponding to a difference between an image generated by the motion prediction image generator and the corresponding block of the current frame in an inter mode, or generates a spatial residue corresponding to a difference between an image generated by the spatial prediction image generator and the corresponding block of the current frame in an intra mode;

a compression encoder, which compresses and encodes a residue of the G component generated by the residue generator and prediction residues of the R-B components generated by a prediction residue generator;

an inverse compression decoder, which decodes the compressed and encoded data and generates a restored residue of the G component and restored prediction residues of the R-B components;

a residue transformer, which performs a linear transformation on the restored residue of the G component generated by the inverse compression decoder;

a prediction residue generator, which generates differences between each of the residues of the R-B components generated by the residue generator and the value transformed by the residue transformer;

a residue compensation unit, which generates restored residues of the R-B components by adding the prediction residues of the R-B components generated by the inverse compression decoder to the value transformed by the residue transformer; and an original image generator, which generates an original image by adding the residues of the R-B components generated by the residue compensation unit and the residue of the G component generated by the inverse compression decoder to the prediction image generated by the motion prediction image generator in an inter mode, or generates an original image by adding the residues of the R-B components generated by the residue compensation unit and the residue of the G component generated by the inverse compression decoder to the prediction image generated by the spatial prediction image generator in an intra mode.

24. The apparatus of claim 23, wherein the motion prediction image generator comprises:

a motion estimation units, which estimates a motion between a current frame and a previous frame in units of predetermined sized blocks; and a motion prediction unit, which outputs a block corresponding to a motion vector generated by the motion estimation unit, and the spatial prediction image generator comprises:

a spatial estimation unit, which estimates a prediction direction from pixels spatially close to a pixel block of the current frame; and a spatial prediction unit, which outputs a block corresponding to the direction predicted by the spatial estimation unit.

25. The apparatus of claim 23, wherein the compression encoder comprises:

a frequency transformer, which compresses the residue of the G component generated by the residue generator and the prediction residues of the R-B components generated by the prediction residue generator;

a quantizer, which quantizes data compressed by the frequency transformer; and an entropy coder, which performs entropy encoding of the quantized data, and the inverse compression decoder comprises:

an inverse quantizer, which inverse-quantizes the quantized data; and an inverse frequency transformer, which performs an inverse frequency transformation of the inverse quantized data and generates restored residue of the G component and restored prediction residues of the R-B components.

26. An image decoding method using residue prediction of an image, which decodes an encoded original image including at least more than two components, where a residue is defined as a difference between the original image and a prediction image, and a prediction residue is defined as a difference between a residue of each component of the original image and a value that an encoded residue of a predetermined component is restored and transformed into a predetermined value, the method comprising:

decoding a residue of a predetermined component of the encoded original image;

transforming the decoded residue into a predetermined value;

decoding prediction residues of the components, which are not decoded;

obtaining residues of the components, which are not decoded, by adding the value transformed into the predetermined value to the prediction residues; and restoring the original image by adding a prediction image to the residue of each component.

27. The method of claim 26, wherein the decoded residue is transformed into the predetermined value using correlations among components of the original image.

28. The method of claim 26, wherein the original image is one of an R-G-B type image, a Y-Cb-Cr type image, and an X-Y-Z type image.

29. An image decoding method using residue prediction of an image, which decodes an encoded original image including R-G-B components, where a temporal residue is defined as a difference between an original image and a prediction image by estimating a motion between a current frame and a previous frame with respect to each of the R-G-B components, and a prediction residue is defined as a difference between a value that an encoded residue of a predetermined component is restored and transformed into a predetermined value and a residue of a component, which is not transformed, the method comprising:

decoding a temporal residue of the G component from the encoded image including R-G-B components;

transforming the decoded residue of the G component into a predetermined value;

decoding prediction residues of the R-B components, which are not decoded;

obtaining residues of the R-B components by adding the value transformed into the predetermined value to the prediction residues; and restoring the original image by adding a prediction image to the residues of the R-G-B components.

30. The method of claim 29, wherein the motion estimation is performed in units of predetermined sized blocks.

31. The method of claim 29, wherein the restored residue of the G component is transformed into the predetermined value using correlations among the R-G-B components.

32. The method of claim 29, wherein the restored residue of the G component is transformed into the predetermined value using a linear transformation by multiplying the restored residue value of the G component by a predetermined value and adding the multiplied value to an offset.

33. The method of claim 32, wherein the linear transformation differently linear transforms block sizes used when a motion is compensated in units of blocks from the previous frame.

34. The method of claim 29, wherein the obtaining the residue of the G component and the obtaining and encoding the prediction residues of the R and B components using the residue of the G component comprises obtaining a residue of the R component and obtaining and encoding prediction residues of the G and B components using the residue of the R component.

35. The method of claim 29, wherein the obtaining the residue of the G component and the obtaining and encoding the prediction residues of the R and B components using the residue of the G component comprises obtaining a residue of the B component and obtaining and encoding prediction residues of the G and R components using the residue of the B component.

36. An image decoding method using residue prediction of an image, which decodes an encoded original image including R-G-B components, where a spatial residue is defined as a difference between an original image and a prediction image in which a prediction direction is estimated from pixels spatially close to a current frame with respect to the R-G-B components, and a prediction residue is defined as a difference between a value that an encoded spatial residue of a predetermined component is restored and transformed into a predetermined value and a residue of a component, which is not transformed, the method comprising:

decoding a residue of the G component;

transforming the decoded residue of the G component into a predetermined value including the decoded residue value of the G component;

decoding prediction residues of the R-B components, which are not decoded;

obtaining residues of the R-B components by adding the value transformed the residue of the G component into the predetermined value to the prediction residues; and restoring the original image by adding a prediction image to the residues of the R-G-B components.

37. The method of claim 36, wherein the restored residue of the G component is transformed into the predetermined value using correlations among the R-G-B components.

38. The method of claim 36, wherein the restored residue of the G component is transformed into the predetermined value using a linear transformation by multiplying the restored residue value of the G component by a predetermined value and adding the multiplied value to an offset.

39. The method of claim 38, wherein the linear transformation differently linear transforms spatially predicted directions used when residues of R-G-B components are obtained.

40. The method of claim 36, wherein the decoding the residue of the G component and the decoding the prediction residues of the R and B components using the residue of the G component comprises decoding a residue of the R plane and decoding prediction residues of the G and B components using the residue of the R component.

41. The method of claim 36, wherein the decoding the residue of the G component and the decoding the prediction residues of the R and B components using the residue of the G component comprises decoding a residue of the B component and decoding prediction residues of the G and R components using the residue of the B component.

42. An image decoding method using residue prediction of an image, which decodes an R-G-B color image, where a residue is defined as a difference between the color image and a prediction image, and a prediction residue is defined as a difference between a residue of each component of the original image and a value that an encoded residue of a predetermined component is restored and transformed into a predetermined value, the method comprising:

(1) restoring a residue of a G component image from encoded image data;

(2) obtaining residue images of R-B components from encoded image data and generating restored residue images of R-B components by adding the residue images of R-B components to a value obtained by linearly transforming the restored residue value obtained in step (1);

(3) in an inter mode, restoring a color image of the R-G-B components by adding the residue values of the R-G-B components restored in steps (1) and (2) to a prediction image obtained by performing temporal motion compensation of color components of a previous frame; and (4) in an intra mode, restoring a color image of the R-G-B components by adding the residue values of the R-G-B components restored in steps (1) and (2) to a prediction image obtained by estimating a predicted direction from spatially adjacent pixels.

43. The method of claim 42, wherein step (1) comprises: obtaining a restored residue image of the G component by performing an inverse variable length decoding, an inverse quantization, and an inverse frequency transformation on the encoded data, and step (2) comprises:

obtaining the residue images of the R-B components by performing an inverse variable length decoding, an inverse quantization, and an inverse frequency transformation of the encoded data and generating the restored residue images of the R-B components by adding the residue images of the R-B components to a value obtained by linearly transforming the restored residue value obtained in step (1).

44. An image decoding apparatus using residue prediction of an image, which decodes an encoded original image including at least more than two components, where a residue is defined as a difference between the original image and a prediction image, and a prediction residue is defined as a difference between a residue of each component of the original image and a value that an encoded residue of a predetermined component is restored and transformed into a predetermined value, the apparatus comprising:

an inverse compression decoder, which decodes the encoded image data and generates a restored residue image of a predetermined component of the image and restored prediction residues of components corresponding to residues, which are not restored;

a residue transformer, which transforms the restored residue of the component generated by the inverse compression decoder into a predetermined value including the restored residue value of the component;

a residue compensation unit, which generates restored residues by adding the prediction residues generated by the inverse compression decoder to the value transformed by the residue transformer; and an original image generator, which generates an original image by adding a prediction image to each of the residues generated by the residue compensation unit and the residue of the predetermined component generated by the inverse compression decoder.

45. An image decoding apparatus using residue prediction of an image, which decodes an encoded original image including R-G-B components, where a temporal residue is defined as a difference between an original image and a prediction image by estimating a motion between a current frame and a previous frame with respect to the R-G-B components, and a prediction residue is defined as a difference between a value that an encoded residue of a predetermined component is restored and transformed into a predetermined value and a residue of a component, which is not transformed, the apparatus comprising:

a motion compensation unit, which generates a temporally motion compensated prediction image;

an inverse compression decoder, which decodes the encoded image data and generates a restored residue image of the G component and restored prediction residues of the R-B components;

a residue transformer, which performs a linear transformation on the restored residue of the G component generated by the inverse compression decoder;

a residue compensation unit, which generates restored residues of the R-B components by adding the prediction residues of the R-B components generated by the inverse compression decoder to the value transformed by the residue transformer; and an original image generator, which generates an original image by adding a prediction image generated by the motion compensation unit to the residues of the R-B component generated by the residue compensation unit and the residue of the G component generated by inverse compression decoder.

46. An image decoding apparatus using residue prediction of an image, which decodes an encoded original image including R-G-B components, where a spatial residue is defined as a difference between an original image and a prediction image by estimating a prediction direction from pixels spatially close to a current frame with respect to the R-G-B components, and a prediction residue is defined as a difference between a value that an encoded spatial residue of a predetermined component is restored and transformed into a predetermined value and a residue of a component, which is not transformed, the apparatus comprising:

a spatial prediction unit, which generates a prediction image obtained by estimating a prediction direction from spatially adjacent pixels;

an inverse compression decoder, which decodes the encoded image data and generates a restored residue image of the G component and restored prediction residues of the R-B components;

a residue transformer, which performs a linear transformation on the restored residue of the G component generated by the inverse compression decoder;

a residue compensation unit, which generates restored residues of the R-B components by adding the prediction residues of the R-B components generated by the inverse compression decoder to the value transformed by the residue transformer; and an original image generator, which generates an original image by adding a prediction image generated by the spatial prediction unit to the residues of the R-B components generated by the residue compensation unit and residue of the G component generated by inverse compression decoder.

47. An image decoding apparatus using residue prediction of an image, which decodes an encoded original image including at least more than two components, where a residue is defined as a difference between the original image and a prediction image, and a prediction residue is defined as a difference between a residue of each component of the original image and a value that an encoded residue of a predetermined component is restored and transformed into a predetermined value, the apparatus comprising:

a motion compensation unit, which generates a temporally motion compensated prediction image;

a spatial prediction unit, which generates a prediction image obtained by estimating a prediction direction from spatially adjacent pixels;

an inverse compression decoder, which decodes the encoded image data and generates a restored residue image of a G component and restored prediction residues of R-B components;

a residue transformer, which performs a linear transformation on the restored residue of the G component generated by the inverse compression decoder;

a residue compensation unit, which generates restored residues of R-B components by adding the prediction residues of R-B components generated by the inverse compression decoder to the value transformed by the residue transformer; and an original image generator, which generates an original image by adding the residues of R-B components generated by the residue compensation unit and the residue of the G component generated by inverse compression decoder to a prediction image generated by the motion compensation unit in a inter mode or to a prediction image generated by the spatial prediction unit in an intra mode.

48. The apparatus of claim 47, wherein the inverse compression decoder comprises:

an entropy decoder, which performs entropy decoding of the encoded image data;

an inverse quantizer, which inverse-quantizes the entropy decoded data; and an inverse frequency transformer, which generates the restored residue of the G component and the restored prediction residues of R-B components by performing an inverse frequency transformation on the inverse quantized data.

49. A computer readable medium having recorded thereon a computer readable program for performing an image encoding method using residue prediction of an image, which encodes an original image including at least more than two components, the method comprising
  obtaining a residue corresponding to a difference between the original image and a prediction image with respect to each component of the original image;
  encoding the residue of a predetermined component of the original image;
  restoring the encoded residue of the predetermined component and transforming the restored residue into a predetermined value including the restored residue value; and
  encoding prediction residues corresponding to differences between each of residues of components of the original image, which are not encoded, and the residue, which is restored and transformed into the predetermined value.

50. A computer readable medium having recorded thereon a computer readable program for performing an image decoding method using residue prediction of an image, which decodes an encoded original image including at least more than two components, where a residue is defined as a difference between the original image and a prediction image, and a prediction residue is defined as a difference between a residue of each component of the original image and a value that an encoded residue of a predetermined component is restored and transformed into a predetermined value, the method comprising:
  decoding a residue of a predetermined component of the encoded original image;
  transforming the decoded residue into a predetermined value;
  decoding prediction residues of the components, which are not decoded;
  obtaining residues of the components, which are not decoded, by adding the value transformed into the predetermined value to the prediction residues; and
  restoring the original image by adding a prediction image to the residue of each component.

* * * * *